Patented Dec. 19, 1939

2,184,171

UNITED STATES PATENT OFFICE 2,184,171

WASHING COMPOSITION

Kurt Sponsel, Wiesbaden-Biebrich, and Karl Daimler, Frankfort-on-the-Main-Hochst, Germany, assignors to Kalle & Co. Aktiengesellschaft, Wiesbaden-Biebrich, Germany No Drawing. Application May 2, 1936, Serial No. 77,546. In Germany May 2, 1935

1 Claim. (Cl. 87—5)

The present invention relates to washing composition.

In the washing means usually employed soaps form the essential constituent. It has also already been proposed to employ washing means which are free from soap, but these were in regard to their properties, for example in respect to their foaming property, less efficient than the soaps.

Now, it has been discovered that an excellent washing composition free from soap is obtained if a wetting agent consisting in an alkali metal salt of naphthalene sulphonic acid or a substitution product thereof is combined with a water soluble cellulose ethyl ether β-sulphonate.

As naphthalene sulphonic acid compound, for example, sodium naphthalene sulphonate, sodium dimethylnaphthalene sulphonate and sodium dibutylnaphthalene sulphonate are particularly suitable. Also alkali salts of aralkylnaphthalene sulphonic acids come into consideration.

As cellulose ether compound, for instance, the sodium salt of cellulose ethyl ether β-sulphonic acid or also the salt of a mixed ether which contains besides the ethan sulphonic acid radical further substituted or unsubstituted alkyl groups is employed. A suitable mixed ether can be produced, for example, by causing ethylene oxide and the sodium salt of chlorethan-sulphonic acid ($Cl.CH_2.CH_2.SO_3H$) to react with alkalicellulose.

The washing agents produced according to the invention possess good foaming and cleansing properties. The new washing agents may, as a result of their neutral condition, be employed in the most varied kinds of washing processes together with other substances of the most varied nature, for instance other washing agents. Salts which give off oxygen may be added to them without danger of decomposition. If desired, water, filling materials, coloring materials, substances for improving the odour and the like may be added to the said mixtures.

1. 5 parts of sodium hydroxyethylcellulose ethyl ether β-sulphonate, 30 parts of soda, 5 parts of sodium dibutyl-naphthalene sulphonate and 60 parts of filling material of the usual kind are dissolved in 10,000 parts of water. The washing lye thus obtained is particularly suitable for the cleansing of linen, cotton and the like. If, in the above named mixture, the water is omitted and the other constituents are intimately mixed with one another in suitable manner an excellent washing powder is obtained. The mentioned cellulose ether is prepared for instance by treating alkali cellulose with ethylene oxide and the sodium salt of chlorethan sulphonic acid in such degree that 0.25 mol of the former and 0.7 mol of the latter compound are combined with 1 mol of cellulose.

2. Another washing agent which gives good results in use consists of 1 part of sodium cellulose ethyl ether β-sulphonate, 1 part of sodium dibutyl-naphthalene sulphonate, 2 parts of soda and 1 part of sodium metaphosphate. The mentioned cellulose ether is prepared for instance by treating alkali cellulose with the sodium salt of chloroethan sulphonic acid in such degree that 0.8–1 mol of the named compound is combined with 1 mol of cellulose.

Instead of the sodium dibutyl-naphthalene sulphonate, sodium dinonyl-naphthalene sulphonate, for instance, may be employed.

We claim:

A washing composition comprising in admixture a wetting agent selected from the group consisting of the alkali metal salts of naphthalene sulphonic acids and the substitution products thereof and a water soluble cellulose ethyl ether β sulphonate.

KURT SPONSEL.
KARL DAIMLER.